United States Patent [19]

Hauck

[11] 3,994,646

[45] Nov. 30, 1976

[54] APPARATUS FOR PRODUCING DOUBLE-WALLED TUBES OF PLASTIC MATERIAL

[75] Inventor: Edgar Hauck, Konigsberg, Germany

[73] Assignee: Frankische Isolierrohr-und Metallwaren Werke Gebr. Kirchner, Konigsberg, Germany

[22] Filed: Mar. 24, 1975

[21] Appl. No.: 561,322

[52] U.S. Cl. .......................... 425/133.1; 425/326 R; 425/369; 425/396
[51] Int. Cl.² ........................................ B29D 23/04
[58] Field of Search ......................... 425/326–327, 425/131.1, 133.1, 133.5, 112–113, 392–396, 380–381, 369–371, 387 B

[56] References Cited
UNITED STATES PATENTS

| | | | |
|---|---|---|---|
| 2,957,201 | 10/1960 | Fields et al. | 425/133.1 |
| 3,280,430 | 10/1966 | Antrobus | 425/370 |
| 3,677,676 | 7/1972 | Hegler | 425/133.1 |
| 3,743,456 | 7/1973 | Cini | 425/133.1 |
| 3,743,457 | 7/1973 | Cini | 425/133.1 |
| 3,891,007 | 6/1975 | Kleykamp | 425/395 |

FOREIGN PATENTS OR APPLICATIONS

| | | | |
|---|---|---|---|
| 1,496,201 | 8/1966 | France | 425/133.1 |
| 2,031,496 | 12/1971 | Germany | 425/326 |

Primary Examiner—Francis S. Husar
Assistant Examiner—Carl Rowold
Attorney, Agent, or Firm—Michael J. Striker

[57] ABSTRACT

An apparatus for producing a double-walled tube of plastic material having an outer corrugated wall and an inner wall connected to the inner crests of the corrugated outer wall, in which an extrusion head is arranged coaxially within mold means formed by a plurality of mold sections traveling along endless paths and abutting along portions of the paths against each other to form a tubular mold having an inner corrugated surface. The injection head comprises two coaxially arranged annular extrusion nozzles having outlet ends axially spaced from each other through which plastic material is extruded. The injection head further includes a passage for gas under pressure having a discharge end in the region of the outlet end of the first extruding nozzle for pressing, by means of the gas under pressure passing therethrough, the tubular plastic material emanating from the first extrusion nozzle against the inner corrugated surface of the tubular mold to thus form the outer corrugated wall of the double-walled tube, and means downstream of the second annular nozzle for pressing the plastic material passing therethrough and forming the inner wall of the tube against the inner crests of the corrugated outer wall.

9 Claims, 3 Drawing Figures

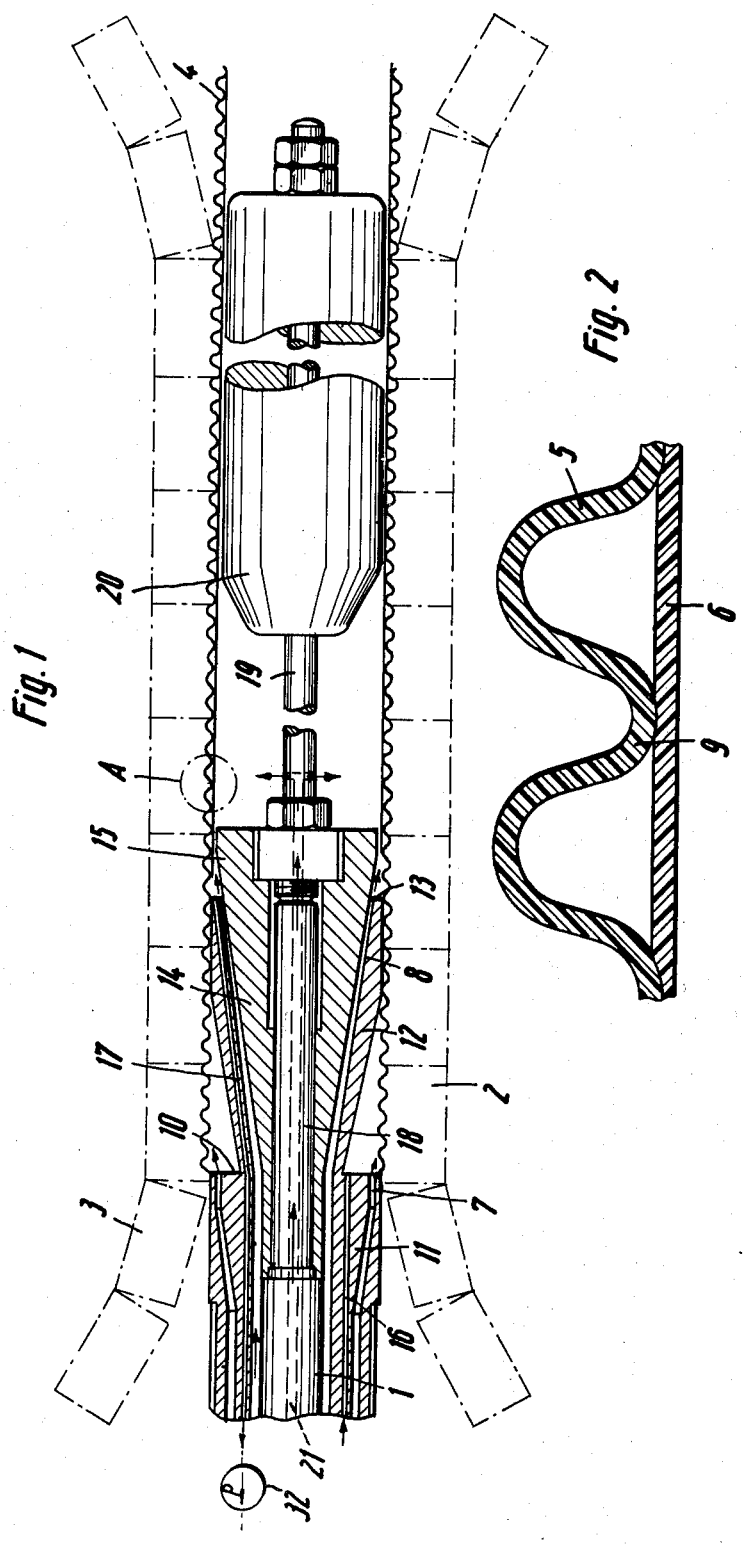

APPARATUS FOR PRODUCING DOUBLE-WALLED TUBES OF PLASTIC MATERIAL

BACKGROUND OF THE INVENTION

The present invention relates to an apparatus for producing double-walled tubes of plastic material having an outer wall provided with annular or thread-like helical corrugations and an inner wall which has at least in longitudinal direction and preferably also in circumferential direction a smooth inner surface. The apparatus includes an extrusion head arranged coaxially within tubular mold means formed by a plurality of mold sections traveling along endless paths and abutting against portions of the paths against each other to form a tubular mold having an inner corrugated surface. The extrusion head comprises two coaxially arranged annular extrusion nozzles having outlet ends axially spaced from each other through which plastic material is extruded. The extrusion head further includes a passage for gas under pressure having a discharge end between the outlet ends of the nozzles for pressing the tubular plastic material emanating from the first extrusion nozzle against the inner corrugated surface of the tubular mold to thus form the outer corrugated wall of the double-walled tube, whereas means are provided downstream of the second extrusion nozzle for pressing the plastic material emanating therefrom and forming the inner wall of the tube against the inner crests of the corrugated outer tube wall. In known apparatus of this kind (Pat. No. 3,280,430), the two extrusion nozzles have radially outwardly directed outlet ends and are connected to each other by axial channels, so that the two extrusion nozzles are supplied with plastic material from the same supply channel. The outlet ends of the two extrusion nozzles are axially spaced from each other for a distance which is substantially equal twice the pitch of the corrugations of the outer tubular wall. The discharge end of a passage for gas under pressure is located between the outlet ends of the annular extrusion nozzles to form an overpressure downstream of the first extrusion nozzle to thereby press the plastic material emanating from the first extrusion nozzle against the corrugated inner surface of the tubular mold. A piston having an outer diameter substantially equal to the inner diameter of the inner tubular wall is arranged downstream of the second extrusion nozzle for pressing the plastic material emanating in tubular form from the second extrusion nozzle against the inner crests of the corrugated outer tubular wall.

Due to the mechanical pressing of the tubular plastic material forming the inner wall of the double-walled tube onto the inner crests of the corrugated outer tube, the danger exists that the material of the inner wall will be partly displaced, especially if the aforementioned piston is closely dimensioned in such a manner to assure a proper connection of the inner tubular wall with the inner crests of the outer corrugated tubular wall. If the inner tubular wall is not sufficiently pressed against the corrugated outer tubular wall, the likelihood exists that the inner tubular wall becomes subsequently disconnected from the outer tubular wall and will collapse. This danger is further increased due to the necessary overpressure for pressing the tubular plastic material emanating from the first extrusion nozzle against the corrugations of the tubular mold, since the gas under pressure will be enclosed between the corrugations of the outer tubular wall and the inner tubular wall which closes the corrugations so that the enclosed gas under pressure will tend to move the inner tubular wall radially inwardly of the currugated outer wall. Furthermore, the overpressure between the extrusion nozzles will detrimentally effect a proper adherence of the tubular wall of plastic material emanating from the second extrusion nozzle onto the outer corrugated tubular wall which, in turn, will require increase of the pressure produced by the piston and reduction of the manufacturing tolerances for the piston.

The difficulties resulting from the aforementioned overpressure can be partly avoided by exhausting the air in the corrugation of the tubular mold from the outer surface of the tube of plastic material, as for instance shown for a double-wall corrugated tube in the German Auslegeschrift No. 1,203,940. However, since the mold is necessarily composed of mold sections which only in the region of the outlet ends of the extrusion nozzles abut against each other, such an exhaustion of air must necessarily be carried out through the mold sections, which leads to a very complicated construction.

SUMMARY OF THE INVENTION

It is an object of the present invention to provide for an apparatus for producing a double-walled tube of plastic material having an outer corrugated wall and inner wall connected to the inner crests of the outer wall, and which avoids the disadvantages of such apparatus known in the the art.

It is a further object of the present invention to provide for an apparatus of the aforementioned kind in which a proper adherence of the inner wall of the inner crests of the corrugated outer wall can be assured without substantially distorting either of the walls.

It is an additional object of the present invention to provide for an apparatus for the aforementioned kind which is constructed with relatively few and simple parts so that the apparatus may be manufactured at reasonable cost and will stand up properly under extended use.

With these and other objects in view, which will become apparent as the description proceeds, the apparatus according to the present invention for producing a double-walled tube of plastic material having a corrugated outer wall and an inner wall which at least in the longitudinal direction of the tube has an inner surface extending parallel to the axis of the tube, mainly comprises mold means including a plurality of mold sections having inner corrugated surfaces and being movable along endless paths to abut along portions of these paths against each other to form a tubular mold, an extrusion head extending into the tubular mold coaxially therewith and having a first annular extrusion nozzle having an outlet end and a second annular extrusion nozzle coaxial with said first annular extrusion nozzle and having an outlet end downstream of the outlet end of the first extrusion nozzle, passage means for a gas under pressure in the injection head and having a discharge end between the outlet end of the first and that of the second nozzle to maintain between the aforementioned outlet ends an overpressure for pressing the tubular plastic material emanating from the outlet end of the first nozzle against the inner corrugated surface of the tubular mold, first means for substantially preventing gas under pressure fed through the passage means to pass to the outlet end of the second extrusion nozzle, and second means for pressing the tubular plastic material emanating from the outlet end of the second nozzle into the inner crests of the corrugated outer tubular mold.

Each of the extrusion nozzles comprises an inner core and an outer wall radially spaced and coaxial with the inner core, and the outer wall of the second extrusion nozzle, projecting from the inner core of the first extrusion nozzle, forms, downstream of the outlet end of the latter, a sealing piston having a cross section substantially equal to the inner free cross section of the outer wall and such a length to substantially prevent passage of gas under pressure to the downstream side of the sealing piston. The extrusion head further comprises pressure equalization passage means having an inlet end in the outer wall of the second nozzle adjacent the outlet end of the latter for permitting discharge of any gas under pressure which has passed to the downstream side of the sealing piston. Suction means may also be connected to the pressure equalization passage to increase the amount of gas discharged therethrough.

The above described construction of the apparatus of the present invention will assure a simple and positive pressing of the tubular plastic material forming the corrugated outer wall into the corrugated inner surface of the tubular wall, while the therefore necessary overpressure will not disturb proper extrusion and adherence of the tubular plastic material forming the inner wall of the double-walled tube. Any pressure gas which may pass through the gap between the sealing piston and the outer tubular wall may automatically flow out through the equalization channel upstream of the second annular nozzle if an appropriate pressure difference is present, for instance if the outer end of the pressure equalization channel is connected with the surrounding atmosphere. At the same time, the gas under pressure present in the corrugation of the outer wall will flow out through the pressure equalization channel, as the corresponding corrugations come in the region of the inlet end of this channel. This will prevent that any gas under pressure will remain in the corrugations of the outer wall when such corrugations are closed by applying the inner tubular wall to the inner crests of the corrugations of the outer wall. This will assure that the connection between the inner wall with the inner crests of the corrugated outer wall will not subsequently be disturbed.

An essential sealing of the overpressure space downstream of the first extrusion nozzle is already obtained when the sealing piston has a length which is only slightly longer than the distance between two adjacent corrugations of the outer tubular wall. During the advance of the tubular outer wall along the sealing surface of the sealing piston, there is then always at least one inner crest of a corrugation in sealing position on the circumferential sealing surface of the piston so that at any time at least one throttle in the gap between the sealing piston and the outer tubular wall is provided. Advantageously, however, the sealing piston with its sealing surface has such a length which is equal to that of a plurality of successive crests on the corrugated outer wall. In this way, the sealing action of the piston is not only increased, but the sealing piston can also be used for corrugated walls with the same inner diameter but with another pitch of the corrugations therein.

As mentioned above, the sealing piston should prevent escape of the gas under pressure maintained in the space downstream of the first extrusion nozzle beyond the peripheral sealing surface of the piston. In other words, the sealing piston shall assure that substantially only such an amount of pressure gas will pass the sealing surface thereof as is contained in the corrugation of the corrugated outer wall and transported by these corrugations beyond the sealing surface. As mentioned above, the major portion of the pressure gas taken along in the corrugations of the outer wall will flow out through the equalization channel. If the normal pressure difference between the overpressure and the pressure of the surrounding atmosphere should not be sufficient for this purpose, then the gas under pressure which has passed beyond the sealing surface of the piston may be additionally sucked out through the pressure equalization channel by connecting an appropriate suction pump thereto. The suction action of the pump may be adjusted in accordance with the amount of pressure gas which is taken past the sealing piston in the corrugations of the outer wall. By such adjusting the suction action of the pump, a proper evacuation of the pressure gas may also be carried out if the corrugations of the outer wall are rather deep or wide.

If the corrugations in the outer tubular wall are in helical form, then an open helical channel is formed through which relatively large amounts of pressure gas may flow. This can be prevented by forming, in a known manner, interruption in the corresponding inner corrugations of the tubular mold.

If desired, it is also possible to provide through the pressure equalization channel in the corrugation of the outer tubular wall, prior to pressing the inner tubular wall into the inner crests of the corrugations, an underpressure in the corrugations. On the other hand, it is also possible to maintain in the corrugations of the outer wall a very small overpressure so that the inner tubular wall is supported between adjacent inner crests of the corrugations of the outer wall.

Thereby it should be taken into account that the gas pressure in the corrugations will drop due to decrease of the temperature with increasing distance from the extrusion nozzle. The gas pressure in the corrugations can also be adjusted in such a manner that already in the region closely adjacent to the second extrusion nozzle, or only at a certain distance therefrom, in which the tube of plastic material has already cooled to the surrounding temperature, corresponds to atmospheric pressure.

To assure a smooth and close adherence of the tube of plastic material forming the outer wall onto the corrugations of the tubular mold, it is possible with the present invention to operate with a considerable overpressure. Especially at very deep corrugations it may be advantageous to let the air in the corrugations of the tubular mold escape therefrom to the surrounding atmosphere through open channels which preferably communicate with the valleys of the corrugations.

While it is possible that the outlet ends of the two extrusion nozzles extend in radial direction through the extrusion head, an axially or conically directed outlet end with a small cone angle (with an approximate maximum of 20°) in the first and/or second annular extrusion nozzle is preferred. This is especially advantageous for the second extrusion nozzle through which plastic material forming the inner wall will pass since by this arrangement the inner tubular wall will be placed neatly into the inner crests of the corrugations of the outer tubular wall. If the outer diameter of the annular outlet end of the second extrusion nozzle is substantially equal to the inner diameter of the outer tube wall, then it is possible to place the inlet end of the pressure equalization channel at a flat annular surface at the end of the sealing surface which is adjacent to the second extrusion nozzle. The sealing surface can thereby be extended through a smaller or larger distance between this annular surface and the second extrusion nozzle.

A preferred arrangement according to the present invention is such that the outer diameter of the annular outlet end of the second extrusion nozzle is smaller than the open cross section of the outer tubular wall emanating through the first extrusion nozzle and pressed onto the inner corrugated surface of the tubular mold, that the inlet end of the pressure equalization channel is provided on the end face of the sealing piston, that a second sealing piston is arranged downstream of the core of the second extrusion nozzle, that an additional passage for pressure gas is provided in the core of the second extrusion nozzle so that the space downstream of the second extrusion nozzle may be filled with pressure gas to thereby press the tubular plastic material emanating from the second extrusion nozzle, while still in plastic condition, tightly against the inner crests of the corrugations of the outer tubular wall.

The pressure gas channel in the core of the second extrusion nozzle and the second sealing piston downstream of the second extrusion nozzle, and held axially spaced therefrom for instance by a rod connected to the core of the second extrusion nozzle, will also provide for the tube of plastic material forming the inner wall of the double-walled tube a pressure chamber so that also the tube of plastic material emanating from the second extrusion nozzle is pressed by overpressure in the second pressure chamber onto the already finish-formed corrugated outer wall. The first sealing piston with the pressure equalization channel makes it thereby possible that the gas pressure in the first pressure chamber downstream of the first extrusion nozzle and that in the second pressure chamber downstream of the second extrusion nozzle may be adjusted independent from each other to an optimal pressure to thereby assure a neat abutment of the tubular plastic material emanating from the first extrusion nozzle onto the corrugations of the tubular mold and the neat abutment of the tubular plastic material emanating from the second extrusion nozzle and forming the inner wall of the double-walled tube onto the inner crests of the corrugations of th outer tubular wall. For instance it is possible to maintain in the pressure chamber downstream of the second extrusion nozzle a considerable smaller overpressure than in the overpressure chamber downstream of the first extrusion nozzle. By appropriate regulation of the pressures acting on the tubular plastic material emanating from the first and the second extrusion nozzles and appropriate regulation of the outflow or evacuation of the pressure gas passing the first sealing piston through the pressure equalization channel it is possible to provide the optimum conditions for the extrusion and the clean forming and abutment of the two tubes of plastic material respectively emanating from the first and the second extrusion nozzle. Eventually it is also possible to heat the pressure gas fed into the one or the other pressure chamber to different temperatures. The supporting pressure gas for the two tubes of plastic material will favorably influence the neat abutment onto the corrugations of the tubular mold, respectively, onto the inner crests of the corrugated outer wall and will prevent collapse of one or the other tube of plastic material after emanation thereof from the respective extrusion nozzle. The invention makes is especially possible to produce double-walled tubes of plastic material with very large diameter without the danger that the tubular walls will collapse.

The above mentioned end face of the sealing piston in which the inlet end of the equalization channel is provided can be stepped rearwardly with respect to the outlet end of the second extrusion nozzle. However, it is preferred that the inlet end of the pressure equalization channel is provided in the same end face in which the outlet end of the second extrusion in the same end face in which the outlet end of the second extrusion nozzle is provided. Instead of a single pressure equalization channel, it is also possible, and actually preferred, to provide a plurality of pressure equalization channels which are arranged circumferentially spaced from each other in the sealing piston. It is also possible to provide a plurality of pressure equalization channels, with groups of the inlet ends thereof arranged axially spaced from each other and in which the evacuation of the pressure gas therethrough may be separately regulated.

If, as preferred, overpressure is maintained downstream of the second extrusion nozzle, then the second extrusion nozzle can be constructed in such a manner that the outlet end thereof will extend in axial direction. By the overpressure maintained downstream of the second extrusion nozzle, a neat abutment of the inner wall of the double-walled tube on the inner crests of the corrugation of the outer wall will still be assured. It is, however, preferred that the core of the second extrusion nozzle will protrude axially beyond the outer wall thereof and that this core is gradually increased to a diameter which at least is approximately equal to the inner diameter of the inner tube. This will assure that the plastic tubular material which emanates from the second extrusion nozzle, and which is still in a relatively plastic state, will be properly supported by the core of the second extrusion nozzle and guided up to the abutment of the outer surface thereof into the inner crests of the outer tube wall.

If no overpressure is maintained downstream of the second extrusion nozzle, then the core of the second extrusion nozzle may still assure an intimate connection between the inner and the outer tube wall, especially when the diameter of the double-walled tube to be produced is relatively small. Eventually it is also possible to provide a double-walled tube of plastic material in which the outer tubular wall is in axial direction provided with annular or helically formed corrugations and in which the inner tubular wall is corrugated in circumferential direction while in axial direction the inner surface thereof will extend parallel to the tube axis. In this case, the second extrusion nozzle, as well as the core thereof which projects axially beyond the outlet end of the second tubular nozzle, is preferably also corrugated in circumferential direction. If in this case the inner tubular wall is pressed by a gas maintained at overpressure against the corrugations of the outer tubular wall, then the overpressure must be maintained at such a maximum value so that the corrugations provided in circumferential direction in the inner tubular wall will not be subsequently deformed.

If the flow speed of material emanating through the two extrusion nozzles should be different and only one extruder is provided, then the delivery of the plastic material for the one material stream, preferably the inner material stream, will start advantageously upstream of the torpedo of the extrusion head. Such different material flow speeds are for instance desirable due to the greater length measured along the corrugations of the outer corrugated wall relative to the straight inner wall. In addition, the desired wall thicknesses for the inner and the outer tubular wall of the double-walled tube have to be considered. If the material flow through the first extrusion nozzle should be completely independent from that through the second nozzle, then it is preferred to provide two extruders, to which the extrusion head is connected by an angular connecting piece. By appropriate control devices for each of these extruders, whereby preferably the possibility should exist to regulate the control device of the one extruder under consideration of operating fluctuations in dependency of the other extruder, it is possible to produce double-walled tubes of plastic material with different wall thicknesses in the outer and inner tubular wall or eventually also with different materials for the two walls. The extrusion nozzles are preferably exchangeable against other extrusion nozzles so that, dependent on the extrusion nozzles used, double-walled tubes of different dimensions may be produced.

The outer wall for the second extrusion nozzle which projects in axial direction from the core of the first extrusion nozzle is gradually enlarged, preferably conically, up to the outer surface of the sealing piston. This facilitates especially starting of the apparatus whereby the conical enlargement initially is used for supporting the tube of plastic material for the outer tubular wall until an appropriate overpressure is formed downstream of the first extrusion nozzle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial cross section through the end portion of an extrusion head with two axially spaced extrusion nozzles;

FIG. 2 is a partial cross section through part of the double-walled tube of plastic material encompassed in the dash-dotted circle A of FIG. 1.

DESCRIPTION OF THE PREFERRED EMBODIMENTS

Figure 3:
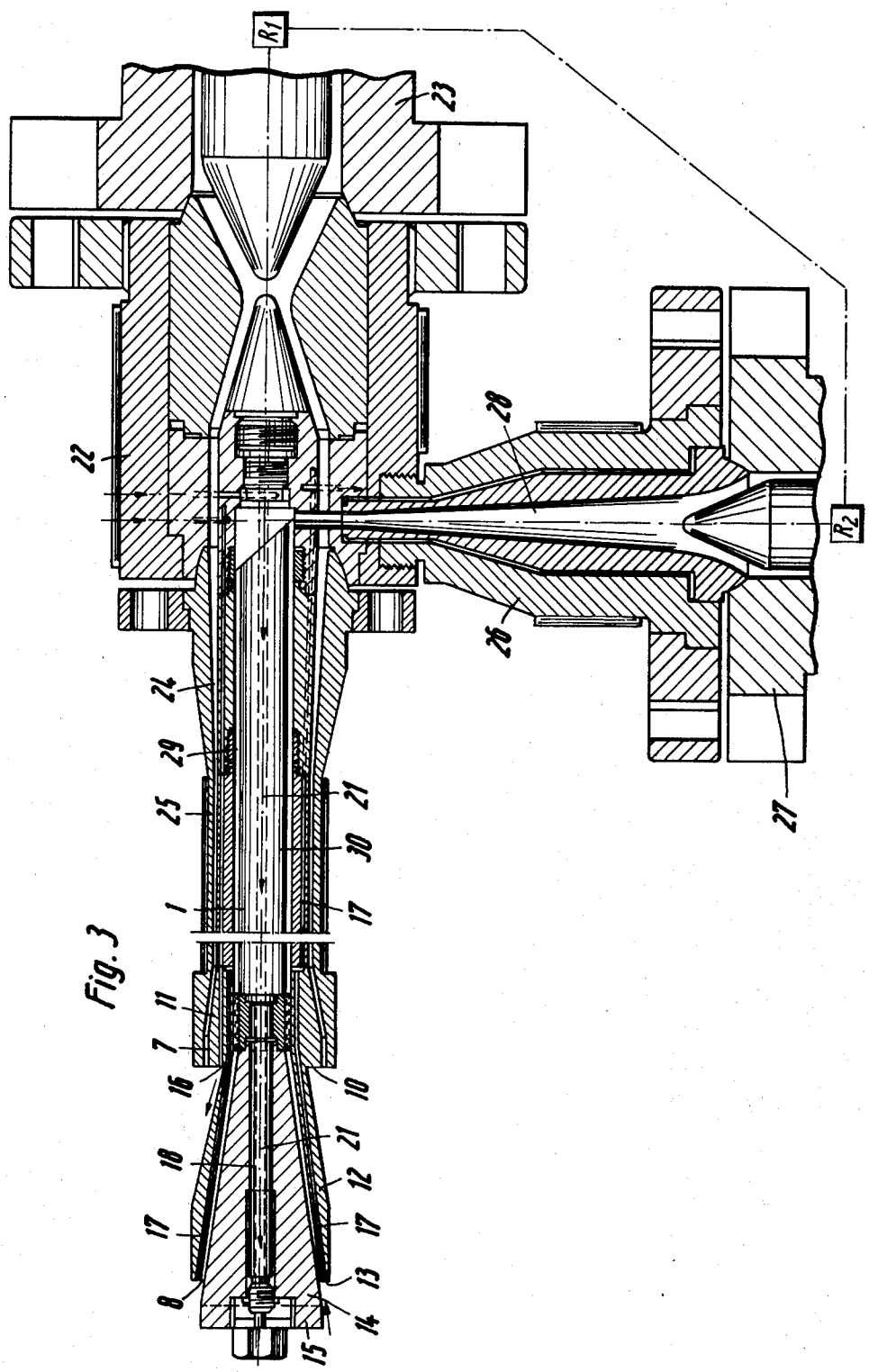
FIG. 3 is an axial cross section through an extrusion head as shown in FIG. 1 with two separate extruders arranged at an angle with respect to each other.

FIG. 1 schematically illustrates a first embodiment of an apparatus according to the present invention for producing a double-walled tube of plastic material having ring-shaped or helical corrugations at its outer wall and an inner wall which at least in the longitudinal direction thereof has a smooth inner surface extending parallel to the axis of the tube. The apparatus comprises an extrusion head 1 which coaxially projects into a tubular mold 2 which is provided at its inner surface with appropriate corrugations corresponding to the corrugations to be formed on the outer tube wall. The tubular mold 2 is formed by two parallel strands of semi-circular mold sections 3 having inner corrugated surfaces and connected to each other and moving along closed tracks, not shown in the drawing. The mold sections 3 are arranged at the inlet end of the extrusion head 1 to abut against each other so as to form a tubular mold, as known for the production of single-walled corrugated tubes. With the apparatus according to FIG. 1, a double-walled tube 4 of plastic material should be formed as shown in part in FIG. 2 in which the outer tubular wall 5 is formed with corrugations, whereas the inner tubular wall 6 extends parallel to the axis of the double-walled tube and has a uniform inner diameter throughout the length thereof and in which the inner tubular wall 6 abuts against the inner crests of the corrugations of the outer tubular wall 5 and is connected to the same.

For this purpose, two axially spaced annular extrusion nozzles 7 and 8 are provided on the extrusion head 1 in which the first extrusion nozzle 7, from which the plastic material forming the outer tubular wall emanates, has an outlet end extending in substantially axial direction, whereas the outlet end of the second extrusion nozzle 8, through which the material forming the inner tubular wall emanates, is arranged along a conical surface. The outlet end of the first extrusion nozzle 7 is provided in an annular end surface 10, extending substantially normal to the axis of the extrusion head, at a small radial distance from the outer circumference of the end face 10. The core 11 of the first extrusion nozzle which projects from the inner circumference of the annular surface 10 beyond the latter is conically enlarged to a sealing piston 12 which forms at the same time the outer wall of the second extrusion nozzle 8. The sealing piston 12 has an annular end face 13 on the inner circumference of which the outlet end of the second extrusion nozzle 8 is arranged. The core 14 of the second extrusion nozzle 8 is in the region of the sealing piston 12 likewise conical and projects in conical form beyond the outlet end of the extrusion nozzle 8 until it reaches at its end 15 a diameter 16 which substantially corresponds to the inner diameter of the inner tube. The end 15 of the core 14 extends at least for a distance equal to the axial spacing or pitch of two successive inner crests of the corrugations of the outer tubular wall.

The outlet end of a passage 16 for pressure gas is provided in the region of the inner diameter of the end face 10, in which the outlet end for the first extrusion nozzle is arranged, for feeding gas under pressure into the space between the end face 10 and the sealing piston 12. The inlet end of a pressure equlization pressure 17 is arranged in the end face 13, at which the outlet end of the second extrusion nozzle 8 is provided, radially outwardly of the latter. The pressure gas passage 16 is connected with a source of pressure gas, not shown in the drawing, and the outer end of the pressure equalization passage 17 communicates either with the outer atmosphere or a suction pump 32 may be connected to the passage 17 at the outer end thereof.

The axial length of the sealing piston 12 corresponds in the embodiment illustrated approximately to four times the pitch of the corrugations in the outer tubular wall 5. The sealing piston 12 will substantially prevent flow of the pressure gas fed through the passage 16 into the space between the end face 10 and the sealing piston 12 to pass beyond the sealing piston to the outlet end of the second extrusion nozzle 8 so that proper extrusion of the material from the second extrusion nozzle and the neat abutment of the tube extruded from the second extrusion nozzle into the inner crests 9 of the corrugations of the outer tubular wall 5 will not be disturbed. In addition, the sealing piston will substantially maintain the overpressure downstream of the first extrusion nozzle 7 so that gas under pressure need to be supplied through the pressure gas passage 16 only in such an amount as will be transported by the corrugations in the outer tubular wall past the sealing piston 12. The pressure gas which passes beyond the sealing piston 12 to the outlet end of the second extrusion nozzle will flow out through the pressure equalization passage 17 to the surrounding atmosphere or be sucked out through the passage 17 by the suction pump 32. The flowing out or the sucking out can be adjusted in such a manner that in the space with which the outlet end of the second extrusion nozzle 8 communicates a desired pressure condition is maintained.

The core 14 of the second extrusion nozzle is provided with an axial bore and is supported on the rod 18 which is carried by the extrusion head 1 and the core 14 is axially fixed on the rod 18. The rod 18 is extended beyond the core 14 by a second rod 19 which carries on its end a second sealing piston 20. The sealing piston 20 has an outer diameter which substantially corresponds to the inner diameter of the inner tubular wall 6. A second pressure gas channel 21 axially extends through the rod 18 and part of rod 19 and has in the rod 19 between the end of the core 14 and the second sealing piston 20 a discharge end.

Pressure gas is fed into the channel 21 at a pressure independent from that of the pressure gas fed into the channel 16. By the pressure of the gas fed through the passage 21, it is possible to maintain in the interior of the inner tube of plastic material emanating from the outlet end of the second extrusion nozzle 8 up to the second sealing piston 20 a desired pressure so that the inner tube is constantly pressed against the inner crests 9 of the corrugated outer wall 5 to obtain thereby an intimate connection between the outer tube 5 and the inner tube 6. In addition, the inner tube 6 is supported by the pressure gas fed into the aforementioned space through the passage 21 and subsequently also through the second sealing piston 20 until the inner and the outer tubular walls are cooled off to such an extent that they cannot collapse any longer. In the same way, the outer tubular wall will be also sufficiently supported downstream of the second extrusion nozzle through the gas pressure and the sealing piston 20.

If no suction pump is provided at the outer end of the passage 17, it may be advantageous to provide instead of the single passage 17 shown in FIG. 1 a plurality of such passages circumferentially displaced from each other and each having inlet ends on the end face 13.

FIG. 3 illustrates an extrusion head 1 similar to that shown in FIG. 1, and parts of the extrusion head shown in FIG. 3 which correspond to the parts of the extrusion head illustrated in FIG. 1 are provided with the same reference numerals. The tubular mold 2 composed of connected wall sections, as described in connection with FIG. 1, is omitted for simplication of the drawing from FIG. 3, but it is to be understood that the apparatus shown in FIG. 3 is provided with a tubular mold a shown and described in connection with FIG. 1. As shown in FIG. 3, the extrusion head 1 is flanged by means of a connecting member 1 to a first extruder 23 extending in axial direction of the extrusion head and supplying the material for the first extrusion nozzle 7.

The supply of plastic material is provided through the outer channels 24 between the core 11 of the first extrusion head 7 and the outer wall 25 thereof. A second extruder 27 is flanged to the connecting member 22 by means of an intermediate head 26, the axis of which extends at a right angle to the axis of the first extruder 23. The second extruder 27 provides the plastic material for the second extrusion nozzle 8. This plastic material flows through a passage 28 in a member extending through the intermediate head 26 and the passage 28 of the second extruder 27 communicates at its upper end with an annular channel 29 between the core 11 of the first extrusion nozzle 7 and the inner core 30 of the extrusion head 1. The core 14 of the second extrusion nozzle 8 forms an axial extension of the inner core 30 of the extrusion head 1. The flow of plastic material through each extruder may be regulated by a pair of regulating means $R_1$ and $R_2$ of known construction respectively connected to the extruders 23 and 27 and the regulating means $R_1$ and $R_2$ may be connected to each other as schematically indicated in FIG. 3 so that one regulating means may be regulated in dependency of the regulation of the other, or the two regulating means may be regulated independent from each other.

As shown in FIG. 3, the pressure gas channels 16 and 21 as well as the pressure equalization channel 17 extend through the whole axial length of the extrusion head 1 and communicate in the connecting member 22 as indicated by the respective arrows with corresponding sources (not shown) of pressure gas for the channels 16 and 21 whereas the outlet end of the pressure equalization channel 17 communicates either witth the outer atmosphere or with a suction pump not shown in FIG. 3.

It will be understood that each of the elements described above, or two or more together, may also find a useful application in other types of apparatus for producing a double-walled tube of plastic material having a corrugated outer wall and an inner wall which at least in longitudinal direction of the tube has a smooth inner surface extending parallel to the axis of the tube differing from the types described above.

While the invention has been illustrated and described as embodied in an apparatus for producing a double-walled tube of plastic material having a corrugated outer wall and an inner wall which at least in longitudinal direction of the tube has a smooth inner surface extending parallel to the axis of the tube, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims is:

1. Apparatus for producing a double-walled tube of plastic material having a corrugated outer wall and an inner wall which at least in longitudinal direction of the tube has an inner surface extending parallel to the axis of the tube, said apparatus comprising mold means comprising a plurality of mold sections having inner corrugated surfaces and being movable along endless paths and abutting along portions of said paths against each other to form a tubular mold; an extrusion head extending into said tubular mold coaxially therewith and having a first annular extrusion nozzle having an outlet end and a second annular extrusion nozzle coaxial with said first annular extrusion nozzle and having an outlet end downstream of said outlet end of said first extrusion nozzle; passage means for gas under pressure in said extrusion head and having a discharge end between the outlet end of said first and that of said second annular extrusion nozzle to maintain between said outlet ends an overpressure for pressing tubular plastic material emanating from the outlet end of said first nozzle against the inner corrugated surface of said tubular mold, each of said annular extrusion nozzles comprising an inner core and an annular outer wall spaced from the coaxial with the respective inner cord, the outer wall of the second extrusion nozzle projecting from the inner core of said first extrusion nozzle and being downstream of the outlet end of said first extrusion nozzle and the discharge end of said passage means enlarged to a sealing piston having a cross-section substantially equal to the inner free cross-section of said outer wall and an axial length which is a multiple of at least twice the distance between successive inner crests of the corrugations of said outer wall to thus substantially prevent passage of gas under pressure beyond the downstream end of said sealing piston; pressure equalization passage means in said injection head and having an inlet end in said outer wall of said second nozzle adjacent the outlet end of the latter for permitting discharge of any gas under pressure which has passed to the downstream side of said sealing piston; and means downstream of the outlet end of said second extrusion nozzle for pressing said tubular plastic material emanating from the outlet end of said second nozzle onto the inner crests of said corrugated outer wall.

2. Apparatus as defined in claim 1 and including suction means connected to said pressure equalization passage means.

3. Apparatus as defined in claim 1, wherein the outlet end of said second extrusion nozzle has an outer diameter which is smaller than the minimum inner diameter of the outer tubular wall emanating through the outlet end of said first extrusion nozzle after being pressed against the inner corrugated surface of said tubular mold and wherein said inlet end of the pressure equalization passage means is located in an end face at the downstream side of said sealing piston.

4. Apparatus as defined in claim 1, wherein said second means for pressing the tubular plastic material emanating from the outlet end of said second extrusion nozzle onto the inner crests of the corrugated outer wall comprise a second sealing piston, means for holding said second sealing piston on the core of the second extrusion nozzle downstream of and coaxial with the core of said second nozzle, and additional pressure gas passage means extending through said core of said second nozzle and having a discharge end between said core of said second extrusion nozzle and said second sealing piston.

5. Apparatus as defined in claim 1, wherein said core of said second extrusion nozzle has a portion projecting in an axial direction beyond said outlet end of said second extrusion nozzle and having a diameter increasing continuously from said outlet end toward the downstream end of said core to a diameter substantially equal to the inner diameter of the inner wall of the double-walled tube, said projecting portion of said core of said second extrusion nozzle constituting part of said means for pressing the tubular plastic material emanating from the outlet end of said second nozzle onto the inner crests of the tubular corrugated outer wall.

6. Apparatus as defined in claim 1, and including for each of said extrusion nozzles a separate extruder.

7. Apparatus as defined in claim 6, and including a pair of regulating means respectively connected to said extruders so that each extruder can be regulated independent from the regulation of the other of said extruders.

8. Apparatus as defined in claim 7, wherein said regulating means are connected to each other so that each of said extruders is regulatable in dependence on the regulation of the other extruder.

9. Apparatus as defined in claim 6, wherein one of said extruders is coaxial with said injection head and the other of said extruders has an axis substantially normal to that of said injection head.

* * * * *